(12) United States Patent
Hadley et al.

(10) Patent No.: US 6,723,218 B2
(45) Date of Patent: Apr. 20, 2004

(54) SYSTEM FOR THE ELECTRODIALYTIC REGENERATION OF AN ELECTROLESS BATH ELECTROLYTE

(75) Inventors: John Stuart Hadley, Hertogenbosch (NL); Peter Anton Adriaan Verhoeven, Vught (NL)

(73) Assignee: Enthone Inc., West Haven, CT (US)

(*) Notice: Subject to any disclaimer, the term of this patent is extended or adjusted under 35 U.S.C. 154(b) by 224 days.

(21) Appl. No.: 10/092,976

(22) Filed: Mar. 7, 2002

(65) Prior Publication Data

US 2002/0130037 A1 Sep. 19, 2002

(30) Foreign Application Priority Data

Mar. 8, 2001 (EP) .............................. 01105765

(51) Int. Cl.⁷ .............................................. B01D 61/46
(52) U.S. Cl. ...................................... 204/633; 204/634
(58) Field of Search ................................. 204/633, 634

(56) References Cited

U.S. PATENT DOCUMENTS 3,766,049 A 10/1973 Smith
3,933,610 A * 1/1976 Ehara et al. ................. 204/529
5,114,554 A 5/1992 Voss et al.
5,376,250 A * 12/1994 Hamano ..................... 204/529

FOREIGN PATENT DOCUMENTS

DE 19849278 C1 7/2000
EP 0787829 A1 8/1997

* cited by examiner

Primary Examiner—Arun S. Phasge
(74) Attorney, Agent, or Firm—Senniger, Powers, Leavitt & Roedel

(57) ABSTRACT

An apparatus for the electrodialytic regeneration of an electroless bath electrolyte. There are diluate compartments through which the bath electrolyte is channeled, concentrate compartments through which a regeneration electrolyte is channeled, an anode, and a cathode. The diluate compartments of the first electrodialysis unit are serially connected to the diluate compartments of the second electrodialysis unit via lines through which the bath electrolyte is sequentially channeled. The concentrate compartments of the first electrodialysis unit are serially connected to the concentrate compartments of the second electrodialysis unit via lines through which the regeneration electrolyte is sequentially channeled.

18 Claims, 1 Drawing Sheet

SYSTEM FOR THE ELECTRODIALYTIC REGENERATION OF AN ELECTROLESS BATH ELECTROLYTE

BACKGROUND OF THE INVENTION

This invention relates to a system, apparatus, and method for regenerating an electroless bath electrolyte.

In addition to galvanic plating methods in which an external current is introduced via electrodes that are placed into the plating bath for the purpose of depositing a metal plating on a work piece, so-called electroless plating methods are known. These methods are most often used to plate nonconducting substances, for example, plastic components. Such metal platings, for example, are applied for various reasons to plastic substrates. For one thing, a metal surface may be desired for esthetic reasons; for another, the objective may be to utilize the material properties of the metal with which a substrate is plated. Such properties include, for example, improved resistance to corrosion or the electrical conductivity of the material used. Thus, it is known, for example, that printed conductors can be applied to printed circuit boards made of plastic (for example, epoxy resins) by means of electroless plating techniques.

In particular, nickel metal is frequently deposited by means of electroless plating technology.

To reduce the metal ions contained in the electrolyte to elemental metal when this type of plating technology is used, an appropriate reducing agent which is oxidized itself during the reaction must be added to the electrolyte. In the case of an electroless nickel bath, hypophosphite ions are added. These reduce the nickel ions contained in the precipitation bath to elemental nickel and are themselves oxidized to orthophosphite ions. The equation of the reaction that takes place when an electroless nickel bath is used can be expressed as follows:

$NiSO_4 + 6NaH_2PO_2 \circledR Ni + 2H_2 + 2P + 4NaH_2PO_3 + Na_2SO_4$ In the course of the metal plating process, nickel ions are gradually removed from the electrolyte and are precipitated as elemental nickel on the surface to be plated; at the same time, hypophosphite ions are continuously oxidized to orthophosphite ions. In other words: for one thing, the concentration of the nickel ions dissolved in the electrolyte and the concentration of the hypophosphite ions contained in the electrolyte decrease in the electrolyte, and for another, the concentration of the orthophosphite ions contained in the electrolyte increases. As a result, the electrolyte is being "depleted." Thus, as the time during which the electrolyte is allowed to stand increases, the quality of a plating deposited with such an electrolyte decreases. This means that the electrolyte can be used only for a certain number of plating runs. Thereafter, the electrolyte must either be replaced or it must be regenerated by means of suitable auxiliary agents. For the nickel precipitation bath, regeneration involves at least the removal of the orthophosphite ions which form as reaction products and, potentially, the addition of spent nickel ions and spent hypophosphite ions.

In addition to the in situ precipitation of undesirable ions in sparingly soluble compounds and the addition of ions which are needed and which are spent in the course of the standing time of the bath, it is also known that electrodialytic methods can be used for the regeneration of electroless precipitation baths. Such methods provide that the depleted bath electrolyte and a regeneration electrolyte which absorbs at least the ions which are to be removed from the depleted bath electrolyte so as to be able to regenerate [the bath electrolyte] are channeled through compartments which are separated from each other by membranes. At the same time, the regeneration electrolyte may contain ions that are to be added to the bath electrolyte. Via electrodes provided in an electrodialysis unit, current is conducted through an electrodialysis unit and an ionic flow is induced. Through the suitable selection of the membranes located between the so-called diluate compartments through which the bath electrolyte flows and the so-called concentrate compartments through which the regeneration electrolyte flows, it is possible to ensure a targeted migration of ions from the bath electrolyte which is passing through the diluate compartments into the regeneration electrolyte which is passing through the concentrate compartments and vice versa.

An example of such an electrodialysis system is described in the German Patent No. DE 198 49 278 C1. In the system described in this printed publication, two separate electrodialysis units are used, each of which comprises diluate compartments and concentrate compartments that are separated from one another by membranes as well as a pair of electrodes, i.e., an anode and a cathode. On the cathode side, the diluate compartments of a first electrodialysis unit are separated from the concentrate compartments of this unit by monoselective cation exchanger membranes and on the anode side by anion exchanger membranes. In the second electrodialysis unit which also comprises diluate compartments and concentrate compartments as well as an anode and a cathode, the diluate compartments are separated from the concentrate compartments by monoselective anion exchanger membranes on the cathode side and by anion exchanger membranes on the anode side. To regenerate the bath electrolyte, this electrolyte is divided into two main streams which are conducted parallel to each other through the diluate compartments of the first electrodialysis unit and the second electrodialysis unit. Similarly, the regeneration electrolyte is divided into substreams which are conducted parallel to each other through the concentrate compartments of the first and the second electrodialysis unit. In the first electrodialysis unit, both orthophosphite ions and hypophosphite ions are removed from the bath electrolyte. Nickel ions still present in the bath electrolyte remain in the electrolyte. In the diluate compartments of the second electrodialysis unit, hypophosphite ions from the regeneration electrolyte are fed into the second substream of the bath electrolyte.

This method is less efficient per run, and it is necessary to recirculate the bath electrolyte to be regenerated several times through the electrodialysis system until the degree of regeneration desired is obtained.

A second system known from prior art is disclosed in EP 0 787 829 A1. This electrodialysis system described in this printed publication also comprises two electrodialysis units which have both diluate compartments and concentrate compartments as well as an anode and a cathode. As to its setup, the first electrodialysis unit of this printed publication is similar to the electrodialysis unit of the German patent specification mentioned above. Again, the diluate compartments of the first electrodialysis unit are separated from the adjacent concentrate compartments by a monovalent cation exchanger membrane on the cathode side and by an anion exchanger membrane on the anode side. The second electrodialysis unit of this electrodialysis system, however, has a setup different from the setup known from the German patent specification above. In this case, the diluate compartments on the cathode side are separated from the adjacent concentrate compartments by a cation exchanger membrane and on the anode side by a monovalent anion exchanger membrane. In the system that is known from this printed publication, both the regeneration electrolyte and the bath electrolyte flow sequentially in one direction through the individual electrodialysis units. In the first electrodialysis unit, the bath electrolyte is depleted of hypo- and ortho-phosphite ions, and in the second electrodialysis unit, hypophosphite ions are returned in a second step. Thus, the system known from EP 0 787 829 A1 is the starting point for the present invention as disclosed in the precharacterizing clause of main claim 1.

The system known from the European patent application [Offenlegungsschrift], however, has the disadvantage that its setup is expensive and that the electrodes used in the electrodialysis units are not sufficiently protected against the detrimental influences of the chemicals contained in the electrolytes.

SUMMARY OF THE INVENTION

Thus, using this well-known prior art as a starting point, the problem to be solved by the present invention is to further develop an electrodialysis system of the type described in the introduction by designing it so that it is less expensive to construct and by considerably increasing the life of the electrodes used.

This problem is solved according to the present invention by providing that the electrodes have separate electrode compartments which are separated from the adjacent compartments by membranes and through which a rinsing electrode is channeled via third lines and that an electrode common to and functioning for both electrodialysis units is located in one of the electrode compartments which are adjacent to compartments of both electrodialysis units.

Thus, the setup of the system for the electrodialytic regeneration of an electroless bath electrolyte according to the present invention has the advantage that two electrodialysis units, through which a sequential flow takes place, jointly utilize one electrode, which means that only three electrodes are used to construct the two electrodialysis units. The jointly utilized electrode may be an anode or a cathode. The use of only three electrodes in the setup of the system according to the present invention makes the use of an otherwise required fourth electrode superfluous and thus reduces the cost of manufacturing such a system. In addition, the overall system which comprises separated electrodialysis units can now be constructed so as to be more compact and space-saving. Between the concentrate and diluate compartments of the first dialysis unit which are adjacent to each other and the diluate and concentrate compartments of the second electrodialysis unit which are adjacent to each other, an electrode compartment housing the electrode jointly utilized by both electrodialysis units is inserted. The number of diluate and concentrate compartments per electrodialysis unit is not limited but can instead be adjusted, as needed, to the throughput of the bath electrolyte to be purified. The key factor is to ensure that, after passing through the first electrodialysis unit, the bath electrolyte passing through the diluate compartments of the first electrodialysis unit passes through the diluate compartments of the second electrodialysis unit.

By incorporating electrode compartments which are separated from the concentrate and diluate compartments and through which a separate rinsing electrolyte can flow, it is ensured that the electrodes are shielded from the ions dissolved in the bath electrolyte and in the regeneration electrolyte so that said ions cannot have a detrimental effect on the electrodes. Instead, the electrode compartments are rinsed with a rinsing electrolyte which ensures, on the one hand, that current can flow from the electrode compartments into the concentrate and diluate compartments of each electrodialysis unit and, on the other hand, that the life or standing time of the electrodes used is considerably increased.

According to a useful further development of the present invention, it is proposed that the rinsing electrolytes present in the electrode compartments be sodium sulfate, potassium sulfate, or sodium phosphate. According to another useful further development of this invention, these [rinsing electrolytes] are used in a concentration ranging from 1 g/L to 30 g/L. A rinsing electrolyte of the composition proposed has good conducting properties, but the concentration of the dissolved ions is not yet high enough to damage the membranes and the electrodes. In addition, the electrolyte has a viscosity sufficiently high for pumping the electrolyte.

In another useful embodiment of the present invention, it is proposed that the system for channeling the bath electrolyte and/or the regeneration electrolyte into the diluate and concentrate compartments of at least one electrodialysis unit have parallel lines to the separate diluate and concentrate compartments, which parallel lines originate from a main feeder line. To channel the electrolytic streams of the bath electrolyte and/or the regeneration electrolyte through an electrodialysis unit, each stream is divided into substreams and channeled parallel to each other through a number of diluate compartments and concentrate compartments of this unit. After the substreams have been channeled through the individual compartments, they are recombined to form one bath electrolyte and one regeneration electrolyte and as such are separately channeled into the second electrodialysis unit or a collecting tank for further use. By channeling the electrolyte streams in the form of substreams parallel to one another through several diluate and concentrate compartments of an electrodialysis unit, the throughput can be increased. The effective ion exchange capacity between a diluate compartment and an adjacent concentrate compartment is multiplied by the number of the diluate and concentrate compartments used.

According to another useful further development of the present invention, a closed loop line for channeling the bath electrolyte through the electrodialysis system is proposed. For this purpose, it is useful to provide for a collecting tank in which the bath electrolyte to be regenerated is stored and from which it is taken and to which it is returned after having been regenerated in the electrodialysis system. The tank can be a bath tank in which the electroless plating is carried out. In such a configuration, the bath electrolyte is so-to-speak regenerated in situ in that a certain quantity of the bath electrolyte contained in the plating tank is removed and regenerated by means of the regeneration system. The quantity of bath electrolyte thus regenerated is channeled back into the plating tank where it recombined with the residual electrolyte. Depending on the requirements that the bath electrolyte must meet, the regeneration rate required can be controlled via the volumetric rate of flow of the bath electrolyte per unit time through the electrodialysis system. If the bath electrolyte used in the process needs to meet higher "purity" requirements, the volumetric rate of flow per unit time through the electrodialysis system for the same bath tank volume must be higher. Correspondingly, the electrodialysis units of the electrodialysis system must be configured for a higher throughput. For this purpose, they may have, for example, a greater number of diluate and concentrate compartments than would be required for a lower electrolyte throughput.

Since, as a rule, the electrolyte for electroless metal plating is used at an increased operating temperature, it is proposed in another useful further development of the present invention that at least in the feed line of the electrodialysis system, but preferably also in the return flow line, a heat exchanger be provided. By means of the heat exchanger in the feed line, i.e., the supply line to the first electrodialysis unit, of the system, the electrolyte is cooled by means of a cooling medium, for example, cooling water. In this manner, the sensitive components of the electrodialysis unit, such as the membranes, are not damaged by an excessively hot electrolyte. With a heat exchanger that is installed in the return flow line of the electrodialysis system, i.e., in the drainage line for the bath electrolyte from the second electrodialysis unit, the bath electrolyte which now has a temperature below the operating bath temperature is again preheated before it is returned to the collecting tank, in particular the bath tank. The two heat exchangers used can be configured in such a way that the cooling medium which is heated in the course of cooling the bath electrolyte contained in the heat exchanger of the feed line of the system is used to heat the bath electrolyte, which is now cold, in the return flow line of the system.

To prevent particles from penetrating the electrodialysis units, another useful further development of this invention proposes that a filter be placed into the feed line of the system, i.e., into the line feeding the bath electrolyte into the first electrodialysis unit. This filter filters particles from the bath electrolyte which may have precipitated and thus prevents clogging of the sensitive membranes between the individual compartments of the electrodialysis unit. It should be ensured that the size of the particles trapped by the filter is sufficiently small, i.e., the filter should be sufficiently fine. For this purpose, cross-flow filtration (micro- or nanofiltration) among other things can be used.

According to yet another useful further development of the present invention, the system also has a closed loop line for channeling the regeneration electrolyte. As proposed in another useful further development of the present invention, this closed loop line preferably comprises a storage tank, from which the regeneration electrolyte is channeled to the first electrodialysis unit and from which the regeneration electrolyte from the second electrodialysis unit is returned. In the collecting tank, the composition of the regeneration electrolyte can be adjusted specifically to the regeneration requirements. Thus, the orthophosphite ions which were removed as waste products from the bath electrolyte can be removed from the regeneration electrolyte, for example, by precipitation. To adjust to an optimum pH value, acids or bases can be added. In addition, nickel ions which had optionally been added as spent material to the bath electrolyte as well as hypophosphite ions can be added at this point.

According to yet another useful further development of the present invention, it is finally proposed that a closed loop line be also provided for the rinsing electrolyte for the electrode compartments. Again, a collecting tank can preferably be provided for this electrolyte, from which the rinsing electrolyte for the electrode compartments flows sequentially through the individual electrode compartments and into which the rinsing electrolyte returns at the end. Since, as a result of the catalysis of water to hydrogen and oxygen which takes place on the electrodes, water is continuously removed from the rinsing electrolyte, it may be useful, if needed, to add water at this point, i.e., at the collecting tank for the rinsing electrolyte, to this electrolyte. For this purpose, a feed line can be provided.

Other characteristics and advantages of the present invention can be taken from the following description of an embodiment of a system for the electrodialytic regeneration of an electroless nickel electrolyte according to the present invention which is shown in the single attached figure.

DETAILED DESCRIPTION OF PREFERRED EMBODIMENTS

Figure 1:
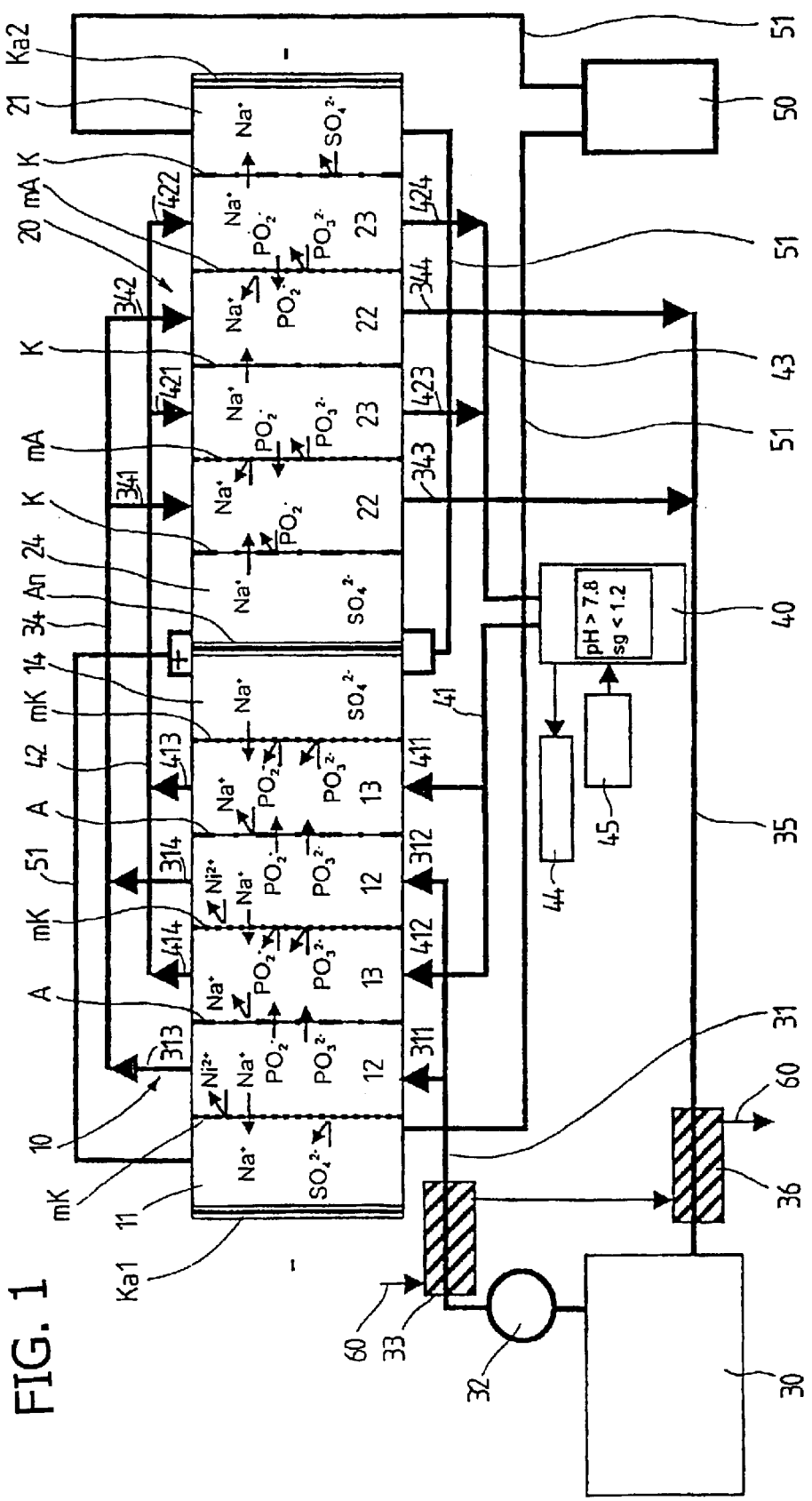
FIG. 1 is a schematic representation of the system of the invention.

The FIGURE shows a system for the electrodialytic regeneration of an electroless bath electrolyte. The heart of the system comprises two electrodialysis units 10 and 20. The first electrodialysis unit 10, shown on the left side of the figure, has a cathode Ka1, an anode An, and a plurality of compartments 11 through 14 which are separated from one another by membranes inserted in between said compartments. To be more specific, these compartments are cathode compartment 11, diluate compartments 12, concentrate compartments 13, and anode compartment 14. On the anode side, cathode compartment 11 is followed by a first diluate compartment 12 and is separated from anode compartment 11 by membrane mK which is permeable to monovalent cations. Further along in the direction of the anode, the first diluate compartment 12 is followed by alternating concentrate and diluate compartments 13 and 12, respectively. On the cathode side, concentrate compartments 13 are separated from diluate compartments 12 by membrane A which is permeable to all anions, and on the anode side by membrane mK which is permeable to monovalent cations. In the practical example shown, the number of diluate and concentrate compartments 12 and 13, respectively, of the first electrodialysis unit 10 is limited to two each. If needed, however, more than two such compartments can be provided. On the anode side, the sequence of diluate and concentrate compartments 12 and 13, respectively, ends with a concentrate compartment 13 which is followed by an anode compartment 14. The last concentrate compartment 13 is separated from anode compartment 14 by membrane mK which is selectively permeable to monovalent cations.

In the drawing, starting at anode An and extending to the right side, a second electrodialysis unit 20 is provided. This second unit utilizes as an anode the same anode An that is utilized by the first electrodialysis unit 10. In addition, the second electrodialysis unit 20 has its own cathode Ka2. Between anode An and cathode Ka2, there are several compartments which are separated from one another by means of membranes. Starting from the anode, these compartments are anode compartment 24, diluate compartments 22, concentrate compartments 23, and cathode compartment 21. Anode compartment 14 of the first electrodialysis unit 10 and anode compartment 24 of the second electrodialysis unit 20 together form a common anode compartment. In this compartment, anode An can be a separating wall but it can also provide for flow-through connections between subcompartments 14 and 24 of the anode compartment. Diluate compartments 22 and concentrate compartments 23 are adjacent to one another and arranged in alternating sequence. In the practical example shown, the second electrodialysis unit 20 has two diluate compartments 22 and concentrate compartments 23 each; however, it is also possible for this unit to have more than two concentrate and diluate compartments 22 and 23. The choice of the number of diluate and concentrate compartments 22 and 23 depends on the volumetric flow rate of the electrodialysis system required per unit of time.

In the second electrodialysis unit 20, anode compartment 24 is separated from adjacent diluate compartment 22 by ion exchanger membrane K which is permeable to cations. The first diluate compartment 22 is followed by concentrate compartment 23 which is separated on the anode side from the diluate compartment by means of ion exchanger membrane mA which is selectively permeable to monovalent anions and on the cathode side from another diluate compartment 22 by ion exchanger membrane K which is permeable to all cations. Similarly, all concentrate compartments of the second electrodialysis unit 20 are separated [on the anode side] by ion exchanger membrane mA which is selectively permeable to monovalent anions and on the cathode side by ion exchanger membrane K which is permeable to all cations. The last concentrate compartment 23, in the figure shown on the right side, is followed by cathode compartment 21 which is separated from said concentrate compartment by ion exchanger membrane K which is permeable to all cations.

The schematic representation of the figure also shows various closed loop electrolyte lines. The bath electrolyte that is to be regenerated is contained in storage tank 30. This electrolyte is channeled via a feed line 31 into diluate compartments 12 of the first electrodialysis unit 10. In feed line 31, particle filter 32 and heat exchanger 33 are located upstream of electrodialysis unit 10. Particle filter 32 filters out particulates potentially present in the electrolyte, thus ensuring that said particulates are prevented from clogging the sensitive pores of the membranes contained in electrodialysis units 10 and 20 and from making said membranes unusable. In the practical example illustrated, preferably a particle filter 32 which filters out particle sizes>10 $\mu$m is used. In feed line 31, particle filter 32 is followed by heat exchanger 33. Downstream of heat exchanger 33, feed line 31 branches into separate distributing lines 311 and 312, each of which opens out into its own diluate compartment 12 of the first electrodialysis unit 10. In addition, the figure shows that diluate compartments 12 have branch-off points for collecting lines 313 and 314 which open out into overflow line 34 which connects diluate compartments 12 of the first electrodialysis unit 10 with diluate compartments 22 of the second electrodialysis unit 20.

Branching off from overflow line 34, distributing lines 341 and 342 lead into diluate compartments 22 of the second electrodialysis unit 20. In turn, diluate compartments 22 of the second electrodialysis unit 20 have branch-off points for collecting lines 343 and 344 which open out into return flow line 35. Return flow line 35 finally leads via heat exchanger 36 back to storage tank 30. The line system described which comprises feed line 31, distributing lines 311,312, diluate compartments 12, collecting lines 313,314, overflow line 34, distributing lines 341,342, diluate compartments 22, collecting lines 343,344, and return flow line 35, together with storage tank 30 forms a first closed loop line for the bath electrolyte to be regenerated.

Next, a second closed loop electrolyte line will be described, starting from storage tank 40 for the regeneration electrolyte. From storage tank 40, feed line 41 leads to the first electrodialysis unit 10. Via distributing lines 411 and 412 which are connected to feed line 41, concentrate compartments 13 are connected to feed line 41. Concentrate compartment 13 of the first electrodialysis unit 10 has branch-off points for collecting lines 413,414 which lead to overflow line 42. This overflow line connects concentrate compartments 13 of the first electrodialysis unit 10 to concentrate compartments 23 of the second electrodialysis unit 20. For this purpose, distributing lines 421,422 are connected to overflow line 43, which distributing lines connect overflow line 42 with concentrate compartments 23. The concentrate compartments have branch-off points for collecting lines 423,424 which open out into return flow line 43. Return flow line 43 finally leads back to storage tank 40 and thus closes the loop.

A third closed loop line starts at storage tank 50. In this storage tank, the rinsing electrolyte for electrode compartments 11, 14, 24, and 21 is located. Storage tank 50 has a branch-off point for ring line 51 which in the left side of the figure first leads to cathode compartment 11, next to anode compartments 14 and 24, and finally to cathode compartment 21 before it finally returns to storage tank 50.

Although not shown in the figure, all three closed loops lines may be fitted with suitable means for conveying the electrolytes, such as pumps, which serve to ensure that the throughput desired is obtained. By adjusting the delivery rate of such pumps or other suitable means for conveying the electrolytes or by using a suitable flow control mechanism, throughput capacities in feed rates per unit of time can be set.

To regenerate a bath electrolyte from storage tank 30, the system operates as follows:

From storage tank 30 which may be the plating tank used in the electroless plating process, the bath electrolyte is channeled via feed line 31 through particle filter 32 and heat exchanger 33 to diluate compartment 12 of the first electrodialysis unit 10. At the same time, to reduce the operating temperature of the bath electrolyte, cooling water is supplied via cooling water line 60 to the heat exchanger. Distributing lines 311 and 312 divide the bath electrolyte into parallel streams and channel them parallel to one another to diluate compartment 12. At the same time, a quantity of regeneration electrolyte is withdrawn via feed line 41 from storage tank 40 and channeled via distributing lines 411 and 412 into concentrate compartments 13 of the first electrodialysis unit 10, which concentrate compartments are adjacent to diluate compartments 12. Between anode An and cathode Ka1, an operating voltage is applied. As a result of the electrical field which builds up between anode An and cathode Ka1, excitation of the ions present in the two electrolytes causes them to migrate. Cations tend to move into the direction of cathode Ka1, anions tend to move into the direction of anode An. Because of the membranes located between the individual compartments, however, the migration of the ions is limited since the monoselective cation exchanger membranes mK and the anion exchanger membranes A are not permeable to all ions. Thus, only monovalent cations can pass from diluate compartment 12 via monoselective cation exchanger membrane mK into the adjacent concentrate compartment 13. As indicated in the figure, these ions are, for example, monovalent sodium ions. In this manner, the ions are removed from the bath electrolyte. The bivalent nickel ions, on the other hand, are unable to pass through the monoselective cation exchanger membrane mK and remain in the bath electrolyte. All anions, i.e., in particular the hypophosphite and orthophosphite ions, on the other hand, can freely pass through the anion exchanger membrane A which borders the diluate compartment on the opposite side. In this manner, these ions reach the neighboring concentrate compartments 13. From the neighboring concentrate compartments 13, no other ions are able to reach diluate compartment 12 and thus the bath electrolyte via the monoselective cation exchanger membrane, on the one hand, and via anion exchanger membrane A, on the other hand. Thus, in the first electrodialysis unit 10, the bath electrolyte is depleted of hypophosphite and orthophosphite ions and sodium ions. These accumulate in the regeneration electrolyte.

After having passed diluate compartments 12 of the first electrodialysis unit 10, the bath electrolyte to be regenerated is collected by collecting lines 313 and 314 and channeled in overflow line 34 to diluate compartments 22 of the second electrodialysis unit 20. Via distributing lines 341,342, the bath electrolyte is divided into substreams and channeled to diluate compartments 22. At the same time, the regeneration electrolyte in the form of parallel substreams is channeled from concentrate compartments 13 of the first electrodialysis unit 10 via collecting lines 413,414, overflow line 42, and distributing lines 421,422 into concentrate compartments 23 of the second electrodialysis unit 20. Between anode An and cathode Ka2 of the second electrodialysis unit 20, which anode is jointly utilized by the two electrodialysis units 10 and 20, another potential gradient is applied, which causes the buildup of an electrical field over the second electrodialysis unit 20. As in the case of the electrical field in the first electrodialysis unit, the electrical field in the second electrodialysis unit also causes a migration of ions, with the anions migrating into the direction of the anode and the cations into the direction of the cathode. In the second electrodialysis unit 20, the membranes again selectively determine the migration of the various ions. Thus, monovalent hypophosphite ions pass from concentrate compartment 21 which, on the cathode side, is located next to diluate compartment 22 through the monoselective anion exchanger membrane A which is located between compartments 22 and 23 and accumulate in the bath electrolyte.

Bivalent orthophosphite ions, on the other hand, are not able to pass through the monoselective anion exchanger membrane mA and thus remain in regeneration electrolyte 23. From concentrate compartment 23 which on the anode side is adjacent to the diluate compartment, sodium ions which had earlier been removed from the bath electrolyte are returned to the bath electrolyte. It is also possible to add other ions, for example, nickel ions as a replacement for the spent nickel, to the bath electrolyte (not shown in the figure). Also, the hypophosphite ions passing through the monoselective anion exchanger membrane mA can be simply those ions which had been removed from the bath electrolyte in the first electrodialysis unit 10; however, it is also possible for these hypophosphite ions to be ions which were already present in the regeneration electrolyte and which had been added to the bath electrolyte in the course of the regeneration process. As an alternative, for the purpose of accumulating nickel ions needed in the nickel bath as well as hypophosphite ions, these ions can also be added directly to the electrolyte by way of compounds containing such ions, for example, nickel sulfate, nickel hypophosphite, or sodium hypophosphite. After passage through the second electrodialysis unit, the regenerated bath electrolyte is added via collecting lines 343,344 into return flow line 35 and via heat exchanger 36 back to storage tank 30. In heat exchanger 36, the bath electrolyte is again heated to a higher temperature, preferably to near its operating temperature. For this purpose, it is possible to use as the heating medium, for example, the cooling water in cooling water line 60 which had been used to cool the electrolyte in the first heat exchanger 33.

Similarly, the regeneration electrolyte exiting from concentrate compartments 23 of the second electrodialysis unit is channeled via collecting lines 423,424 to return flow line 43 and finally into storage tank 40. Reference numerals 44 and 45 indicate that both withdrawals 44 from and additions 45 to the regeneration electrolyte can be made in storage tank 40. As to a withdrawal, this can be, for example, the "waste product" orthophosphite which accumulated in the regeneration electrolyte and which can be removed from the regeneration electrolyte, for example, by means of precipitation or in another manner. In addition, a base, for example, sodium hydroxide, can be added to adjust the pH value to pH 7.8, which value is favorable for use in this process.

Throughout the process, a rinsing electrolyte is channeled from storage tank 50 via ring line 51 through electrode compartments 11, 14, 24, and 21. In the example illustrated, the rinsing electrolyte is an aqueous sodium sulfate solution which, on the one hand, makes it possible to conduct current through the electrode compartments and, on the other hand, does not have a detrimental effect on the electrodes, cathodes Ka1, Ka2, and anode An.

This method according to the present invention makes it possible to remove, in a simple and efficient manner, an undesirable reaction product, for example, in the form of an orthophosphite, from an electroless bath electrolyte, without the loss of valuable ions, such as nickel ions, and without in any other way impairing the usability of the regenerated bath electrolyte.

The setup according to the present invention, in which electrodialysis units 10,20 are configured so that they jointly utilize an electrode (in the practical example shown, anode An), makes possible a compact construction of an electrodialysis system which can be manufactured inexpensively. And finally, the configuration of electrodes Ka1, An, Ka2 in electrode compartments 11, 14, 24, 21 through which a rinsing electrolyte can be channeled has the effect that the life of the electrodes is increased while a high degree of electrodialytic effectiveness is maintained.

What is claimed is:

1. An apparatus for the electrodialytic regeneration of an electroless bath electrolyte comprising:

a first electrodialysis unit and a second electrodialysis unit, each unit having diluate compartments through which the bath electrolyte is channeled, and concentrate compartments through which a regeneration electrolyte is channeled;

two or more electrodes, comprising anode and cathode, in joint operation with the electrodialysis units;

wherein in the first electrodialysis unit the diluate compartments are separated from the concentrate compartments on a cathode side by membranes that are selectively permeable to monovalent cations and on an anode side by membranes that are selectively permeable to all anions;

wherein in the second electrodialysis unit the diluate compartments are separated from the concentrate compartments on a cathode side by membranes that are selectively permeable to monovalent anions and on an anode side by membranes that are selectively permeable to all cations;

wherein the diluate compartments of the first electrodialysis unit are serially connected to the diluate compartments of the second electrodialysis unit via first lines through which the bath electrolyte is sequentially channeled;

wherein the concentrate compartments of the first electrodialysis unit are serially connected to the concentrate compartments of the second electrodialysis unit via second lines through which the regeneration electrolyte is sequentially channeled;

wherein the electrodes are in electrode compartments which are separated from adjacent compartments by membranes and through which electrode compartments a rinsing electrolyte can flow via third lines; and wherein one of said electrode compartments adjacent to the compartments of both electrodialysis units houses an electrode which is shared by both the first and second electrodialysis units.

2. The apparatus of claim 1 wherein the electrode that is shared by both electrodialysis units is an anode.

3. The apparatus of claim 1 wherein the electrode compartments contain a rinsing electrolyte which is an aqueous solution of a rinsing compound selected from $Na_2SO_4$, $K_2SO_4$, $Na_2PO_3$, and mixtures thereof.

4. The apparatus of claim 3 wherein the concentration of the rinsing compound is in a range of from about 1 to about 30 g/L.

5. The apparatus of claim 1 comprising parallel lines leading from a main feeder line to said diluate and concentrate compartments of at least one of the electrodialysis units.

6. The apparatus of claim 1 comprising a closed loop line for passing the electrolyte through the diluate compartments of the electrodialysis units.

7. The apparatus of claim 5 comprising a closed loop line for passing the electrolyte through the diluate compartments of the electrodialysis units.

8. The apparatus of claim 7 comprising a collecting tank in the closed loop line for the electrolyte.

9. The apparatus of claim 7 comprising at least one heat exchanger in the closed loop line.

10. The apparatus of claim 7 comprising at least one filter through which the bath electrolyte passes.

11. The apparatus of claim 7 comprising a closed loop line for passing the regeneration electrolyte through the concentrate compartments of the electrodialysis units.

12. The apparatus of claim 11 comprising a closed loop system for channeling the rinsing electrolyte through the electrode compartments.

13. The apparatus of claim 7 comprising a closed loop system for channeling the rinsing electrolyte through the electrode compartments.

14. The apparatus of claim 1 comprising a closed loop line for passing the regeneration electrode through the concentrate compartments of the electrodialysis units.

15. The apparatus of claim 14 comprising a collecting tank in the line system through which the regeneration electrolyte passes. electrolyte passes.

16. The apparatus of claim 14 comprising a closed loop system for channeling the rinsing electrolyte through the electrode compartments.

17. The apparatus of claim 1 comprising a closed loop system for channeling the rinsing electrolyte through the electrode compartments.

18. An apparatus for the electrodialytic regeneration of an electroless bath electrolyte comprising:

a first electrodialysis unit and a second electrodialysis unit, each unit having diluate compartments through which the bath electrolyte is channeled, and concentrate compartments through which a regeneration electrolyte is channeled;

two electrodes, comprising an anode and a cathode, in joint operation with said electrodialysis units;

wherein in the first electrodialysis unit the diluate compartments are separated from the concentrate compartments on a cathode side by membranes that are selectively permeable to monovalent cations and on an anode side by membranes that are selectively permeable to all anions;

wherein in the second electrodialysis unit the diluate compartments are separated from the concentrate compartments on a cathode side by membranes that are selectively permeable to monovalent anions and on an anode side by membranes that are selectively permeable to all cations;

wherein the diluate compartments of the first electrodialysis unit are serially connected to the diluate compartments of the second electrodialysis unit via first lines through which the bath electrolyte is sequentially channeled;

wherein the concentrate compartments of the first electrodialysis unit are serially connected to the concentrate compartments of the second electrodialysis unit via second lines through which the regeneration electrolyte is sequentially channeled;

wherein the electrodes are in electrode compartments which are separated from adjacent compartments by membranes and through which electrode compartments a rinsing electrolyte can flow via third lines;

wherein one of said electrode compartments adjacent to the compartments of both electrodialysis units houses an electrode which is shared by both the first and second electrodialysis units;

a closed loop system for channeling the rinsing electrolyte through the electrode compartments;

a closed loop line for passing the regeneration electrolyte through the concentrate compartments of the electrodialysis units; and a closed loop line for passing the electrolyte through the diluate compartments of the electrodialysis units.

* * * * *

UNITED STATES PATENT AND TRADEMARK OFFICE
CERTIFICATE OF CORRECTION

PATENT NO. : 6,723,218 B2
DATED : April 20, 2004
INVENTOR(S) : John S. Hadley et al.

It is certified that error appears in the above-identified patent and that said Letters Patent is hereby corrected as shown below:

Column 11,
Line 40, "electrode" should read -- electrolyte --.
Line 44, "electrolyte passes. electrolyte passes" should read -- electrolyte passes. --.

Signed and Sealed this

Eighth Day of February, 2005

JON W. DUDAS
*Director of the United States Patent and Trademark Office*